United States Patent [19]
Yamaguchi et al.

[11] Patent Number: 6,132,049
[45] Date of Patent: Oct. 17, 2000

[54] PICTURE DISPLAY APPARATUS AND COOLING APPARATUS FOR OPTICAL APPARATUS

[75] Inventors: Makoto Yamaguchi, Kanagawa; Naoyuki Kaburagi, Tokyo; Hiroyuki Ono, Tokyo; Kasaku Nakajima, Tokyo, all of Japan

[73] Assignee: Sony Corporation, Tokyo, Japan

[21] Appl. No.: 09/151,273

[22] Filed: Sep. 11, 1998

[30] Foreign Application Priority Data

Sep. 16, 1997  [JP]  Japan ................................. 9-250784

[51] Int. Cl.[7] .................................................... G03B 21/16
[52] U.S. Cl. ................................................ 353/61; 353/57
[58] Field of Search ................................. 353/61, 52, 57, 353/60, 58, 119, 122, 55; 648/748

[56] References Cited

U.S. PATENT DOCUMENTS

| | | | |
|---|---|---|---|
| 3,338,132 | 8/1967 | Ruhle et al. ............................. | 353/61 |
| 5,651,599 | 7/1997 | Fujimori et al. ......................... | 353/61 |
| 5,676,442 | 10/1997 | Fujimori ................................ | 535/119 |
| 5,682,216 | 10/1997 | Lin et al. ............................... | 353/122 |
| 5,868,485 | 2/1999 | Fujimori et al. ........................ | 353/119 |

FOREIGN PATENT DOCUMENTS 1199664  12/1959  France ..................................... 353/61

*Primary Examiner*—William Dowling
*Attorney, Agent, or Firm*—Jay H. Maioli

[57] ABSTRACT

A picture display apparatus and a cooling apparatus used for an optical apparatus for efficiently cooling sections to be cooled through the effective use of air currents supplied from a cooling fan, where in external wall and an internal wall of an air guide section guide rotating air currents generated by the cooling fan to intakes without reducing the air velocity by regulating and directing the air currents in accordance with the shape of the cooling fan and the direction of rotation of the fan. The air currents passing through the air guide section are taken through the intakes into an optical unit and sent to the sections to be cooled including a light valve and a polarizing plate for each color. The sections are thus cooled by the air currents.

19 Claims, 12 Drawing Sheets

PICTURE DISPLAY APPARATUS AND COOLING APPARATUS FOR OPTICAL APPARATUS

BACKGROUND OF THE INVENTION

1. Field of the Invention

The present invention relates to a picture display apparatus for projecting an image onto a screen and so on through spatially modulating light emitted from a light source. The invention further relates to a cooling apparatus used for an optical apparatus having a light source and an optical system through which light emitted from the light source passes, the cooling apparatus being provided for cooling a section including at least part of the optical system.

2. Description of the Related Art

Liquid crystal projectors have been developed as picture display apparatuses intended for showing a picture, for example. Such a liquid crystal projector spatially modulates light from a light source radiating at a liquid crystal light valve and projects light transmitted through the liquid crystal light valve onto a screen and so on through a projection lens so as to display an image.

A related-art liquid crystal projector will now be described, referring to drawings. FIG. 1 to FIG. 4 show the related-art liquid crystal projector. FIG. 1 is a perspective view showing the main part of the projector. FIG. 2 is a top view showing the main part of the projector. FIG. 3 is a cross section illustrating a configuration of the projector including a liquid crystal light valve, a polarizing plate and a cooling fan. FIG. 4 is a perspective bottom view showing the main part of an optical unit of the projector.

The liquid crystal projector 100 comprises: an enclosure not shown; a board 101 provided in the enclosure; a light source 102 provided on the board 101; and an optical unit 103 for spatially modulating light emitted from the light source 102 and projecting the modulated light onto a screen and so on not shown. The top of the optical unit 103 is mostly covered with a lid 121 while part of the top of the optical unit 103 is uncovered. On top of the lid 121, a drive circuit board 104 is provided. The drive circuit board 104 includes a drive circuit for driving liquid crystal valves described later.

The optical unit 103 includes: a cubic composite prism 105; a liquid crystal light valve 106R opposed to a surface 105R of the prism 105; a liquid crystal light valve 106G opposed to another surface 105 G of the prism 105 orthogonal to the surface 105R; a liquid crystal light valve 106B opposed to another surface 105B of the prism 105 parallel to the surface 105R; and a projection lens 116 placed on a side of another surface of the prism 105 parallel to the surface 105G. Polarizing plates 112R, 112G and 112B are each provided on a side of each of the light valves 106R, 106G and 106B that is opposite to a side facing the prism 105. Furthermore, condenser lenses 113R, 113G and 113B are each provided on a side of each of the polarizing plates 112R, 112G and 112B that is opposite to a side facing each of the light valves 106R, 106G and 106B.

In the projector 100, white light emitted from the light source 102 and entering the optical unit 103 goes through a ultraviolet-infrared (UV-IR) cut filter 107, a fly's-eye lens 109 made up of a lens array 109a and 109b and through a main condenser lens 108 and enters a dichroic mirror 111a. Red light of the light entering the dichroic mirror 111a reflects off the dichroic mirror 111a and further reflects off a reflection mirror 114a. The red light then passes through the condenser lens 113R and the polarizing plate 112R. The red light is then spatially modulated by the light valve 106R based on an image signal for a red image and enters the prism 105. The light entering the dichroic mirror 111a other than the red light is transmitted through the dichroic mirror 111a and enters the dichroic mirror 111b. Green light of the light entering the dichroic mirror lib reflects off the dichroic mirror 111b and passes through the condenser lens 113G and the polarizing plate 112G. The green light is then spatially modulated by the light valve 106G based on an image signal for a green image and enters the prism 105. Blue light of the light entering the dichroic mirror 111b is transmitted through the dichroic mirror 111b, passes through a relay lens 116a, and reflects off a reflection mirror 114b. The blue light then passes through a relay lens 115b, further reflects off a reflection mirror 114c, and passes through the condenser lens 113B and the polarizing plate 112B. The blue light is then spatially modulated by the light valve 106B based on an image signal for a blue image and enters the prism 105. The rays of color light entering the prism 105 are composited by the prism 105 and enlarged and projected onto a screen and the like by the projection lens 116 through a mirror not shown.

Means are provided in the projector 100 for reducing heat of the optical components such as the light valves 106R, 106G and 106B and the polarizing plates 112R, 112G and 112B caused by heat of the light source 102 and heat produced by light emitted from the light source 102.

That is, as shown in FIG. 3, the related-art liquid crystal projector 100 includes a cooling fan 110 at the bottom of the optical unit 103 in the neighborhood of the light valve 106 (representing the light valves 106R, 106G and 106B) and the polarizing plate 112 (representing the polarizing plates 112R, 112G and 112B). Numeral 130 in FIG. 3 indicates light incident from the light source 102 on the optical unit 103.

As shown in FIG. 1, the projector 100 includes a duct unit 118 for supplying air currents to the cooling fan 110 by sucking outside air from an opening provided in the enclosure not shown. The duct unit 118 is made up of a duct not shown that is placed on the underside of the board 101 and connected to the cooling fan 110 and a duct 118b placed on the top surface of the board 101 and communicating with the other duct.

As shown in FIG. 4, intakes 123R, 123G and 123B are provided in the bottom of the optical unit 103 so that air currents supplied from the cooling fan 110 reach the light valves 106R, 106G and 106B and the polarizing plates 112R, 112G and 112B, respectively. Between the cooling fan 110 and the intakes 123R, 123G and 123B, a rib 117 in the shape of a nearly rectangular wall is provided for entirely surrounding the intakes 123R, 123G and 123B. In the region surrounded by the rib 117, dividers 122a and 122b are provided for separating the intakes 123R, 123G and 123B from one another. The rib 117 and the dividers 122a and 122b adjust a volume of air supplied to the light valves 106R, 106G and 106B. For example, the light valve 106B for spatially modulating short-wavelength blue light has a high light energy absorption factor and tends to be heated to a high temperature. In order to supply more air to the intake 123B, the positions of the rib 117 and the dividers 122a and 122b are appropriately adjusted so that the divided area corresponding to the intake 123B is larger than the other areas.

As shown in FIG. 1, a fine-mesh filter 119 is provided on the mouth of the duct 118b for preventing dust, bugs and so on from entering the apparatus from outside. As shown in FIG. 3, shield glasses 120a and 120b are fixed to the sides of the light valve 106 with an adhesive. A reduction in quality of a projected image due to dust and so on deposited on the light valve 106 is thereby prevented.

In the projector 100, the cooling fan 110 sucks outside air from the opening made in the enclosure, not shown, through the duct unit 118. The current of the sucked outside air is then supplied to the optical components such as the light valve 106 and the polarizing plate 112. The light valve 106, the polarizing plate 112, the condenser lens 113 (representing the condenser lenses 113R, 113G and 113B) and the prism 105 are thus cooled by the air supplied through the intake 123. The air heated in the optical unit 103 is exhausted from the part of the top of the optical unit 103 uncovered with the rid 121.

However, the following disadvantages are found in the related art projector 100 described so far, due to inefficiency of use of the air current supplied from the cooling fan 110.

(1) In order to increase the brightness of the image projected from the light valve 106, the quantity of light incident on the light valve 106 may be increased by raising the power of the light source 102 or improving the optical system (For example, the efficiency of use of light may be increased through the use of a polarization transforming device for transforming S polarized light [linearly polarized light whose electric field oscillates in the direction orthogonal to the incident surface] into P polarized light [linearly polarized light whose electric field oscillates in the direction parallel to the incident surface].). In this case, the optical components such as the light valve 106 and the polarizing plate 112 are heated to a high temperature and the properties thereof are degraded. To be specific, the light valve 106 may cause a change of colors when heated to 70° C. or above, for example. The polarizing plate 112 may lose its polarizing function and not operate properly when hated to 80° C. or above, for example. Such property degradation often results since the light valve 106B that transmits blue light has a high light energy absorption factor and tends to be heated to a high temperature, as described above.

(2) The life of the optical components such as the light valve 106 and the polarizing plate 112 is reduced when used under a high temperature.

(3) If a cooling fan that supplies a large volume of air at high air velocity is used in order to enhance the cooling efficiency, the noise increases and the product value of the projector is reduced.

(4) If the cooling fan is enlarged or the number of the cooling fan is increased for improving the cooling efficiency, the cost is increased as well as the size of the optical unit is increased.

Those disadvantages result in damage to the optical components including the light valve 106 and replacement thereof Convenience of the user is thereby affected and the cost of the projector is increased.

SUMMARY OF THE INVENTION

It is an object of the invention to provide a picture display apparatus and a cooling apparatus used for an optical apparatus for efficiently cooling a section to be cooled through the effective use of air currents supplied from a cooling fan.

A picture display apparatus of the invention comprises: a light source for emitting light; an image generating section for generating an image by spatially modulating the light emitted from the light source in accordance with information about a picture to display; an optical system for projecting the light modulated at the image generating section; a cooling fan for generating air currents for cooling a section to be cooled including at least part of the image generating section; and a means for guiding the air currents from the cooling fan to the section to be cooled in accordance with a shape of the cooling fan and a direction of rotation thereof.

Accordingly, the air currents from the cooling fan are guided to the section to be cooled in accordance with the shape of the cooling fan and the direction of rotation thereof. The section to be cooled including at least part of the image generating section is cooled by the air currents.

A cooling apparatus of the invention comprises: a cooling fan for generating air currents for cooling the section to be cooled including at least part of an optical system through which light emitted from a light source passes; a means for guiding the air currents from the cooling fan to the section to be cooled in accordance with a shape of the cooling fan and a direction of rotation thereof.

Accordingly, the air currents from the cooling fan are guided to the section to be cooled in accordance with the shape of the cooling fan and the direction of rotation thereof. The section to be cooled including at least part of the optical system is cooled by the air currents.

According to the picture display apparatus and the cooling apparatus of the invention, the air currents from the cooling fan are guided to the section to be cooled by the means for guiding in accordance with the shape of the cooling fan and the direction of rotation thereof. The section to be cooled is therefore efficiently cooled through the effective use of air currents supplied from a cooling fan.

The means for guiding may include an external wall placed between the cooling fan and the section to be cooled and round-shaped and streamline-shaped so as to surround the cooling fan in accordance with the form of the cooling fan and the direction of rotation thereof. The air currents from the cooling fan are thereby guided to the section to be cooled without reducing the velocity of the air currents.

In addition to the external wall, the means for guiding may include an internal wall placed between the cooling fan and the section to be cooled and round-shaped and streamline-shaped so as to surround a rotation axis of the cooling fan in accordance with the form of the cooling fan and the direction of rotation thereof. The air currents from the cooling fan are thereby guided to the section to be cooled without reducing the velocity of the air currents. Furthermore, the air flow returning to the cooling fan that is generated in the neighborhood of the rotation axis of the cooling fan will not affect the air currents directed towards the front of the cooling fan.

According to the picture display apparatus and the cooling apparatus of the invention, part of the internal wall may be cut out. As a result, negative pressure applied to the neighborhood of the rotation axis is decreased so as to reduce effect on the air currents directed towards the front of the cooling fan.

According to the picture display apparatus and the cooling apparatus of the invention, the means for guiding may include a wall, placed between the external wall and the internal wall, for increasing a velocity of air currents passing between the external wall and the internal wall. As a result, the cooling efficiency is further improved.

The means for guiding may have a function of adjusting a volume of air currents passing through intakes. The apparatus is thereby allowed to adjust the volume of air currents passing through the intakes.

The means for guiding may include a wall for introducing the air currents from the cooling fan to an intake. As a result, the cooling efficiency is further improved.

The picture display apparatus and the cooling apparatus of the invention may further comprise a means for regulating divergence of air currents passing through at least one intake. The cooling efficiency is therefore further improved.

The picture display apparatus and the cooling apparatus of the invention may further comprise a means for adjusting a direction of air currents passing through at least one intake. The cooling efficiency of a desired section is thus improved.

Other and further objects, features and advantages of the invention will appear more fully from the following description.

DETAILED DESCRIPTION OF THE PREFERRED EMBODIMENTS

Figure 6:
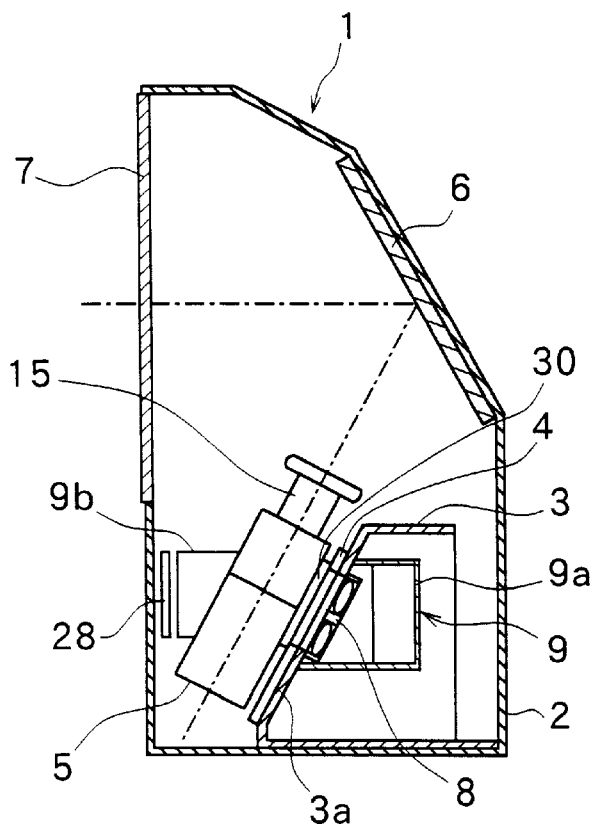
FIG. 6 is a side cross section of the liquid crystal projector of the first embodiment of the invention.

Preferred embodiments of the invention will now be described in detail with reference to the accompanying drawings. FIG. 6 is a side cross section of a liquid crystal projector as a picture display apparatus of a first embodiment of the invention. The liquid crystal projector 1 comprises: an enclosure 2 for enclosing components; a mold chassis 3 having a sloped mounting surface 3a and placed on the bottom of the enclosure 2; a board 4 mounted on the mounting surface 3a; an optical unit 5 mounted on the board 4 and generating and emitting light corresponding to an image to display; a light source not shown fixed to the board 4 and emitting light onto the optical unit 5; a reflection mirror 6 mounted on an upper part of the back side of the enclosure 2 and reflecting light emitted from the optical unit 5; a screen 7 fixed on an upper part of the front side of the enclosure 2, onto which light reflecting off the reflection mirror 6 is projected; a cooling fan 8 mounted on the surface of the board 4 opposite to the surface on which the optical unit 5 is mounted and placed inside the mold chassis 3, provided for supplying air currents to the optical unit 5 and cooling optical components in the optical unit 5; and a duct unit 9 for supplying outside air to the cooling fan 8, one opening thereof surrounding the cooling fan 8 and the other opening thereof being placed in a lower part of the front side of the enclosure 2. Openings are provided in part of the mold chassis 3, the board 4 and the bottom of the optical unit 5 for letting in air currents from the cooling fan 8.

Figure 7:
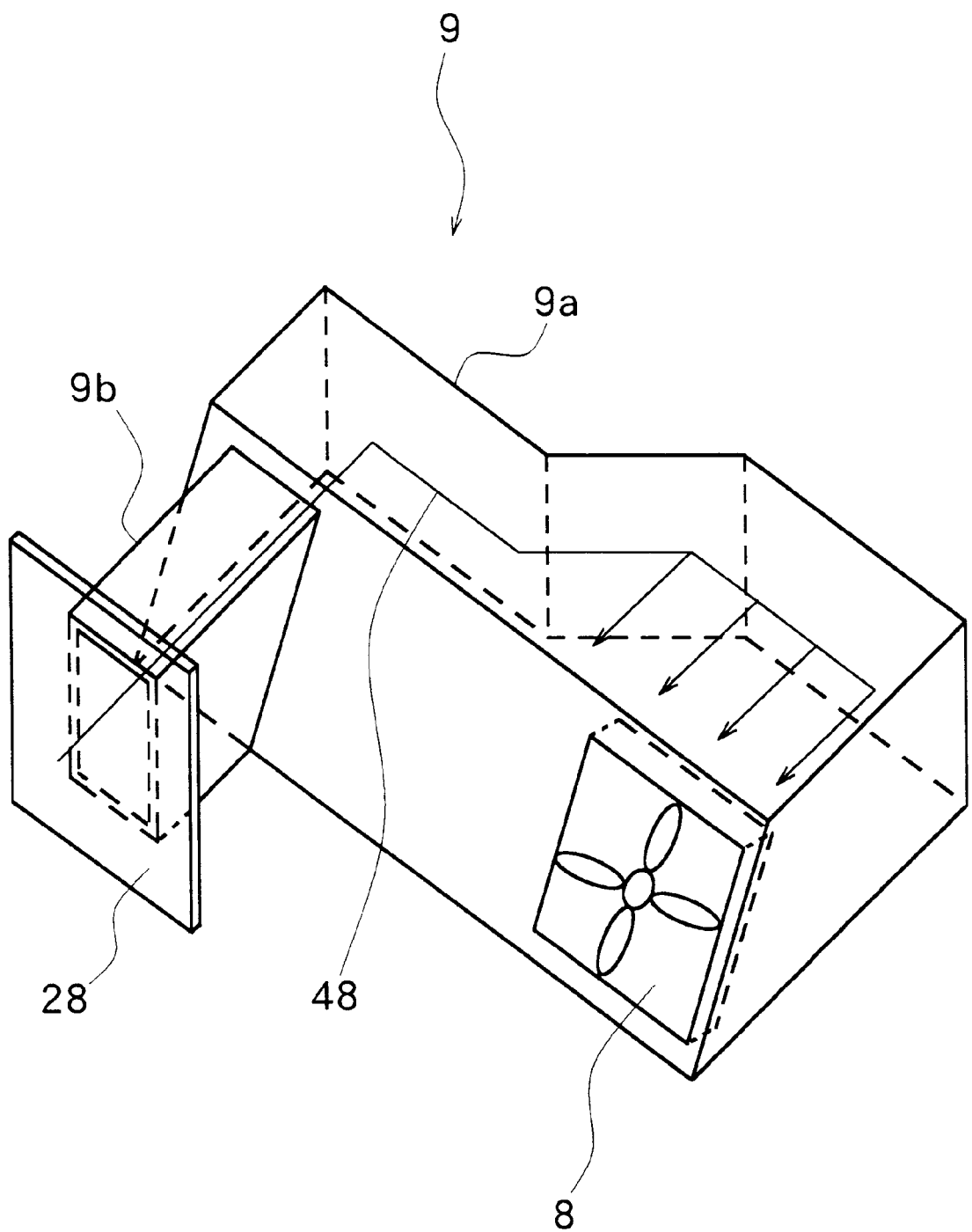
FIG. 7 is a perspective view of a duct unit of the liquid crystal projector of the first embodiment of the invention.

FIG. 7 is a perspective view of the duct unit 9. The duct unit 9 is made up of a duct 9a and a duct 9b. The duct 9a has a length of about 40 cm, for example, and extends to the left of the cooling fan 8 when seen head-on. One opening of the duct 9a surrounds the cooling fan 8. One opening of the duct 9b communicates with the other opening of the duct 9a and the other opening of the duct 9b functions as an intake for taking in outside air through an opening not shown made in the enclosure 2. A mesh filter 28 is placed on the intake of the duct 9b for preventing dust from entering the duct 9b. When the cooling fan 8 is operated, outside air goes through the opening not shown made in the enclosure 2, the filter 28, the duct 9b and the duct 9a one after another and is introduced to the cooling fan 8. Numeral 48 in FIG. 7 indicates a flow of outside air introduced to the cooling fan 8. The outside air introduced to the cooling fan 8 is sent into the optical unit 5 as cooling air through the openings in the mold chassis 3, the board 4 and the bottom of the optical unit 5.

Figure 8:
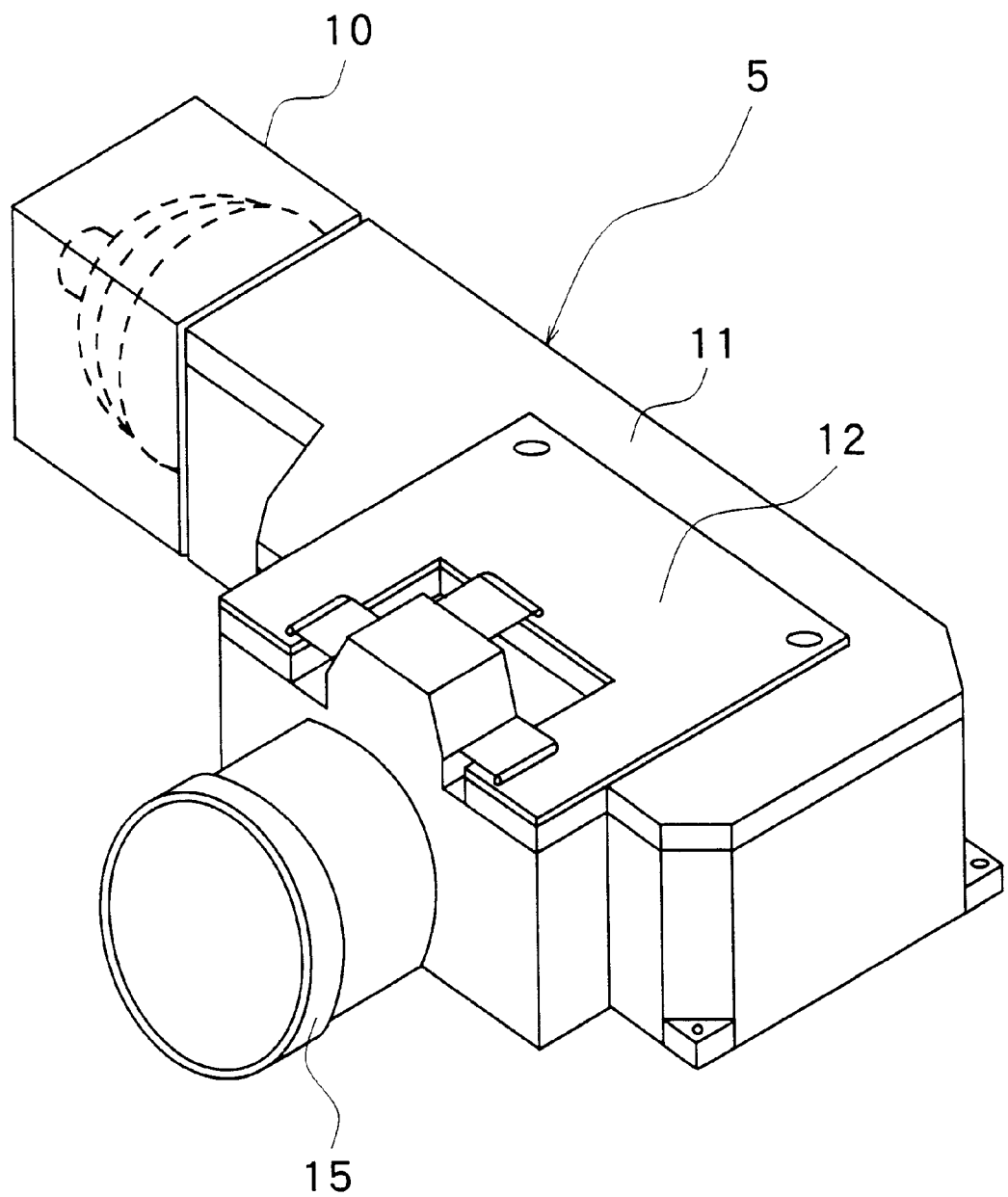
FIG. 8 is a perspective view showing an external appearance of the optical unit of the liquid crystal projector of the first embodiment of the invention.

FIG. 8 is a perspective view showing an external appearance of the optical unit 5. As shown, the optical unit 5 has a projection lens 15 on a side thereof. A light source 10 such as a metal halide lamp for emitting white light is fixed to the optical unit 5. The top of the optical unit 5 is mostly covered with a lid 11 while part of the top of the optical unit 5 is uncovered. On top of the lid 11, a drive circuit board 12 is provided. The drive circuit board 12 includes a drive circuit for driving liquid crystal valves described below.

Figure 9:
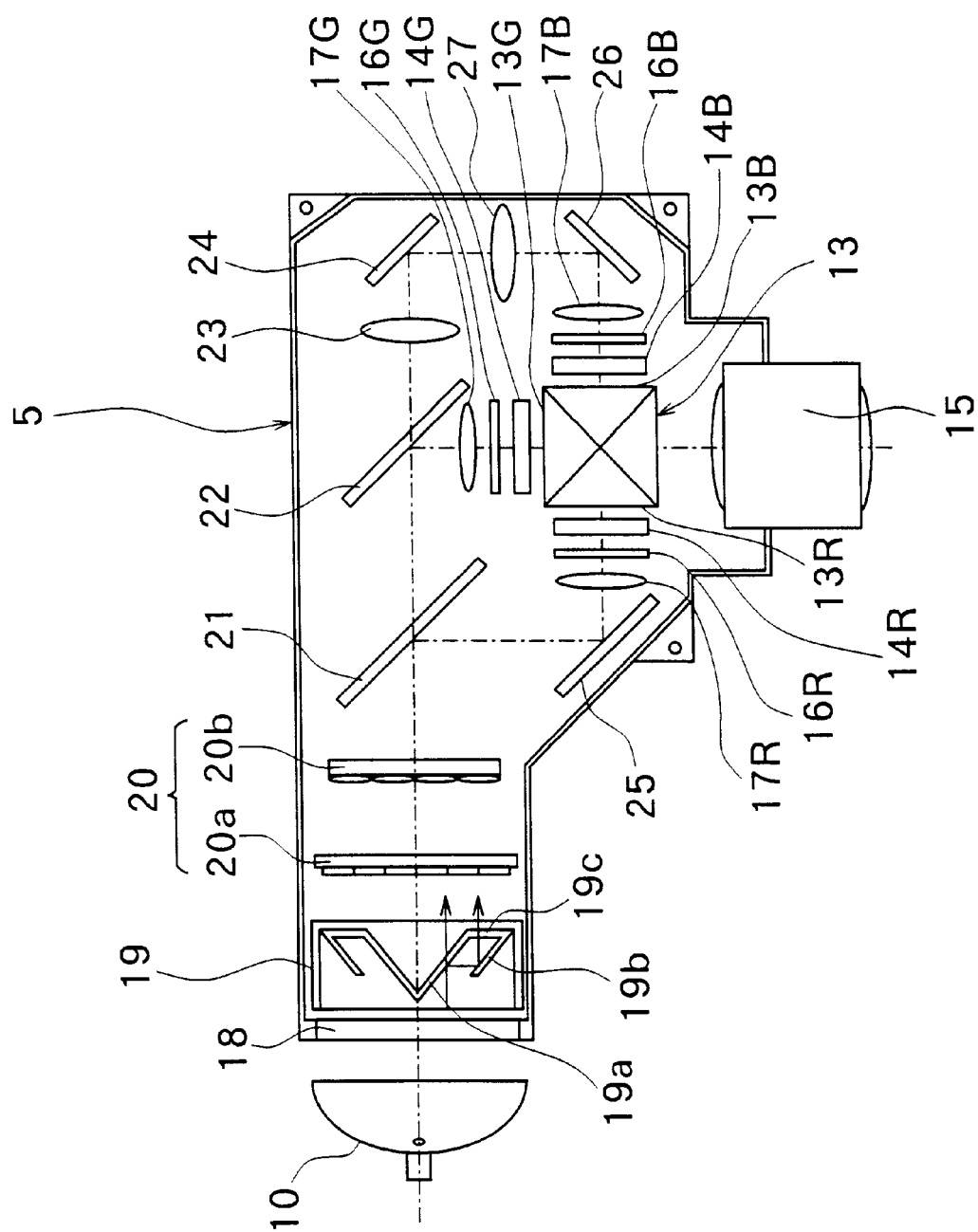
FIG. 9 is a plan view of an optical system inside the optical unit of the liquid crystal projector of the first embodiment of the invention.

FIG. 9 is a plan view of the optical system inside the optical unit 5. The optical unit 5 includes: a cubic composite prism 13; a liquid crystal light valve 14R opposed to a surface 13R of the prism 13; a liquid crystal light valve 14G opposed to another surface 13G of the prism 13 orthogonal to the surface 13R; a liquid crystal light valve 14B opposed to another surface 13B of the prism 13 parallel to the surface 13R; and the projection lens 15 placed on a side of another surface of the prism 13 parallel to the surface 13G. Polarizing plates 14R, 14G and 14B are each provided on a side of each of the light valves 106R, 106G and 106B that is opposite to a side facing the prism 13. Furthermore, condenser lenses 17R, 17G and 17B are each provided on a side of each of the polarizing plates 16R, 16G and 16B that is opposite to a side facing each of the light valves 14R, 14G and 14B. The projection lens 15 corresponds to an optical system of the invention. The optical system in the optical unit 5 except the projection lens 15 corresponds to an image generating section of the invention.

The polarizing plates 16R, 16G and 16B each linearly polarize incident light. The light valves 14R, 14G and 14B are driven by the drive circuit on the drive circuit board 12 and spatially modulate rays of light each passing through the respective polarizing plates 16R, 16G and 16B based on information of a picture to display, that is, image signals for images of red, green and blue, respectively. The prism 13 composites and emits the rays of color light thus spatially modulated. The projection lens 15 enlarges and projects the composite light onto the screen 7 through the reflection mirror 6.

The optical unit 5 further comprises an UV-IR cut filter 18, a polarization transforming device 19, a fly's-eye lens 20, dichroic mirrors 21 and 22, a relay lens 23 and a reflection mirror 24, each placed in line along the path of light emitted from the light source. The optical unit 5 further comprises: a reflection mirror 25 for reflecting light reflected by the dichroic mirror 21 towards the condenser lens 17R; a reflection mirror 26 for reflecting light reflected by the reflection mirror 24 towards the condenser lens 17B; and a relay lens 27 placed between the reflection mirrors 24 and 26.

The TV-IR cut filter 18 removes ultraviolet rays and infrared rays from light emitted from the light source 10.

The polarization transforming device 19 is a device for splitting light emitted from the light source 10 into P polarized light and S polarized light and transforms the S polarized light into P polarized light. The transducer 19 thus emits the P polarized light only. The transducer 19 includes a beam splitter 19a, a total reflection mirror 19b and a half-wave plate 19c. The beam splitter 19a where light emitted from the light source 10 enters transmits and gives off P polarized light and reflects S polarized light. The total reflection mirror 19b reflects the S polarized light reflected by the beam splitter 19a in the same direction as the direction of the P polarized light transmitted through the beam splitter 19a. The half-wave plate 19c shifts the polarizing direction of the S polarized light reflected by the reflection mirror 19b by 90 degrees and thereby transforms the S polarized light into P polarized light and sends out the light. The transducer 19 thereby sends out P polarized light only without wasting light from the light source 10. The P polarized light then enters the light valves 14R, 14G and 14B. The polarizing plates 16R, 16G and 16B are provided for removing S polarized light components from the light sent out by the transducer 19 and thereby producing complete P polarized light.

The fly's-eye lens 20 is made up of an array of lenses 20a and 20b. The fly's-eye lens 20 unifies the illuminance distribution of light applied to the light valves 14R, 14G and 14B.

The dichroic mirror 21 reflects red light of the light from the fly's-eye lens 20 and transmits green and blue light. The red light reflected by the dichroic mirror 21 is reflected by the reflection mirror 25, goes through the condenser lens 17R and the polarizing plate 16R, and is applied to the light valve 14R.

The dichroic mirror 22 reflects the green light of the light transmitted through the dichroic mirror 21 and transmits the blue light. The green light reflected by the dichroic mirror 22 goes through the condenser lens 17G and the polarizing plate 16G and is applied to the light valve 14G.

The blue light transmitted through the dichroic mirror 22 goes through the relay lens 23, the reflection mirror 24, the relay lens 27, the reflection mirror 26, the condenser lens 17B and the polarizing plate 16B and is applied to the light valve 14B.

The rays of color light each incident on the respective light valves 14R, 14G and 14B are each spatially modulated, based on image signals for the respective color images. The prism 13 composites the rays of color light thus modulated. The projection lens 15 enlarges and projects the composite light onto the screen 7 through the reflection mirror 6. The color image is thus displayed on the screen 7.

The projector 1 of the embodiment comprises a cooling apparatus for the optical apparatus for preventing the optical components such as the light valves 14R, 14G and 14B and the polarizing plates 16R, 16G and 16B from being heated up to a high temperature due to heat produced by the light source 10 and heat produced by light emitted from the light source 10. Sections to be cooled in the embodiment include at least the light valves 14R, 14G and 14B and the polarizing plates 16R, 16G and 16B.

Figure 1:
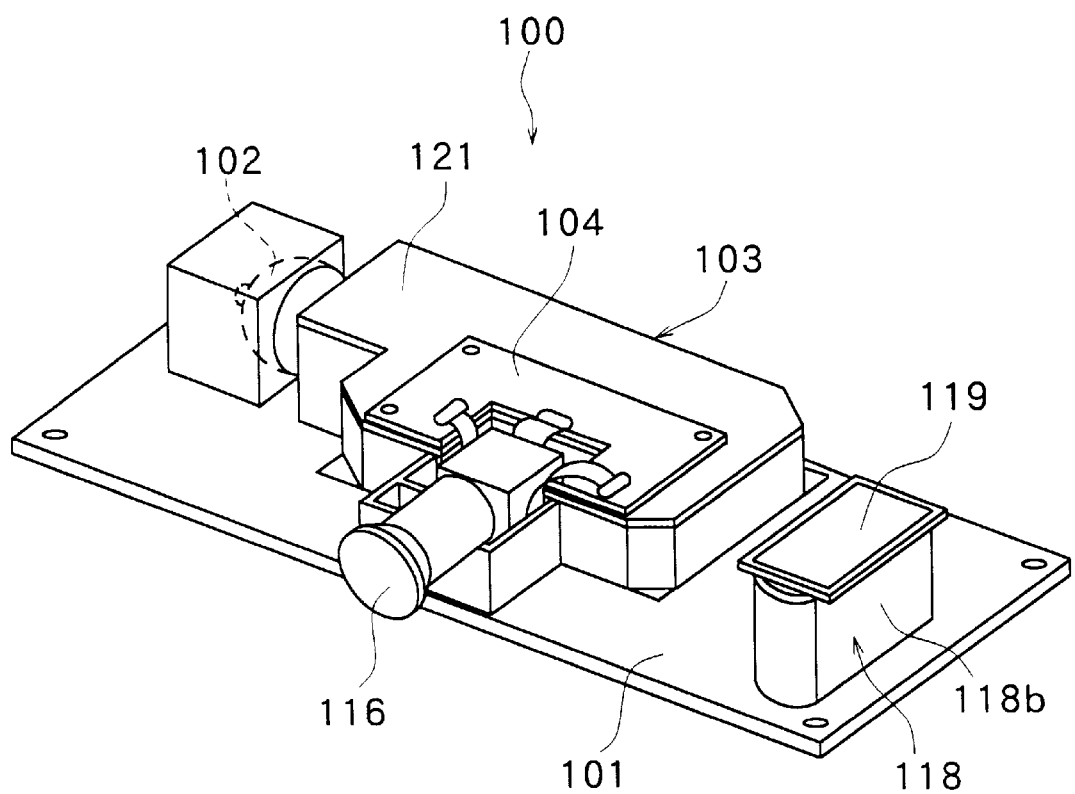
FIG. 1 is a perspective view showing the main part of a related-art liquid crystal projector.
Figure 2:
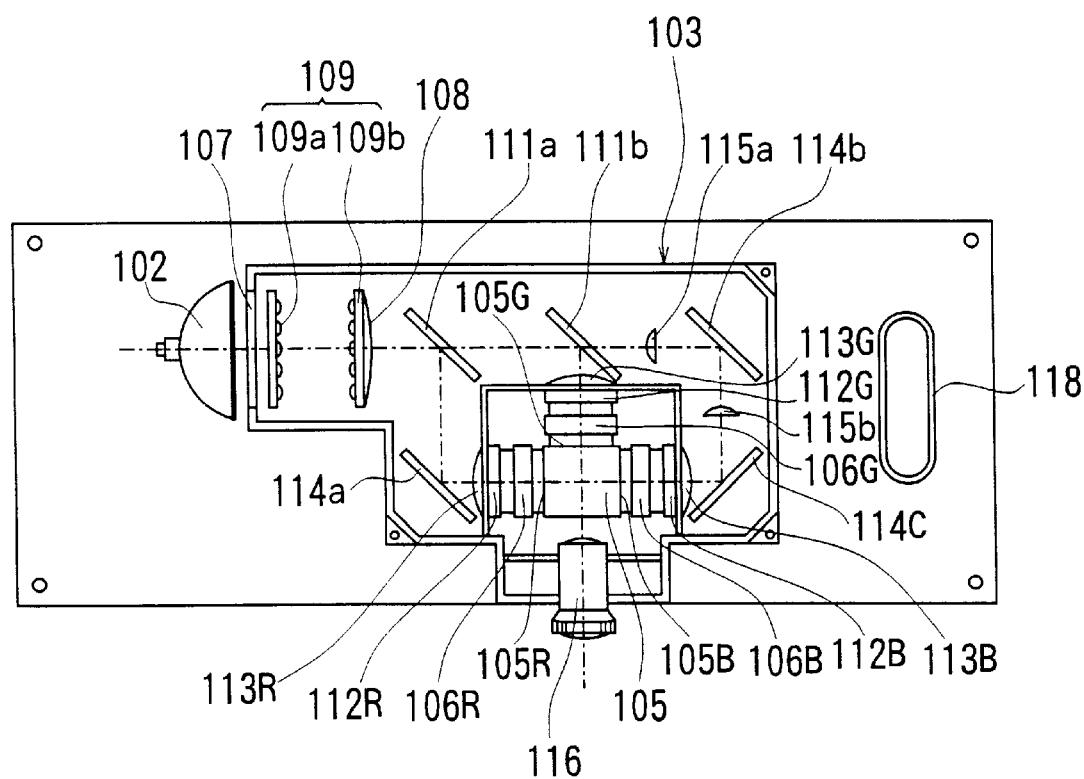
FIG. 2 is a top view showing the main part of the related-art projector.
Figure 3:
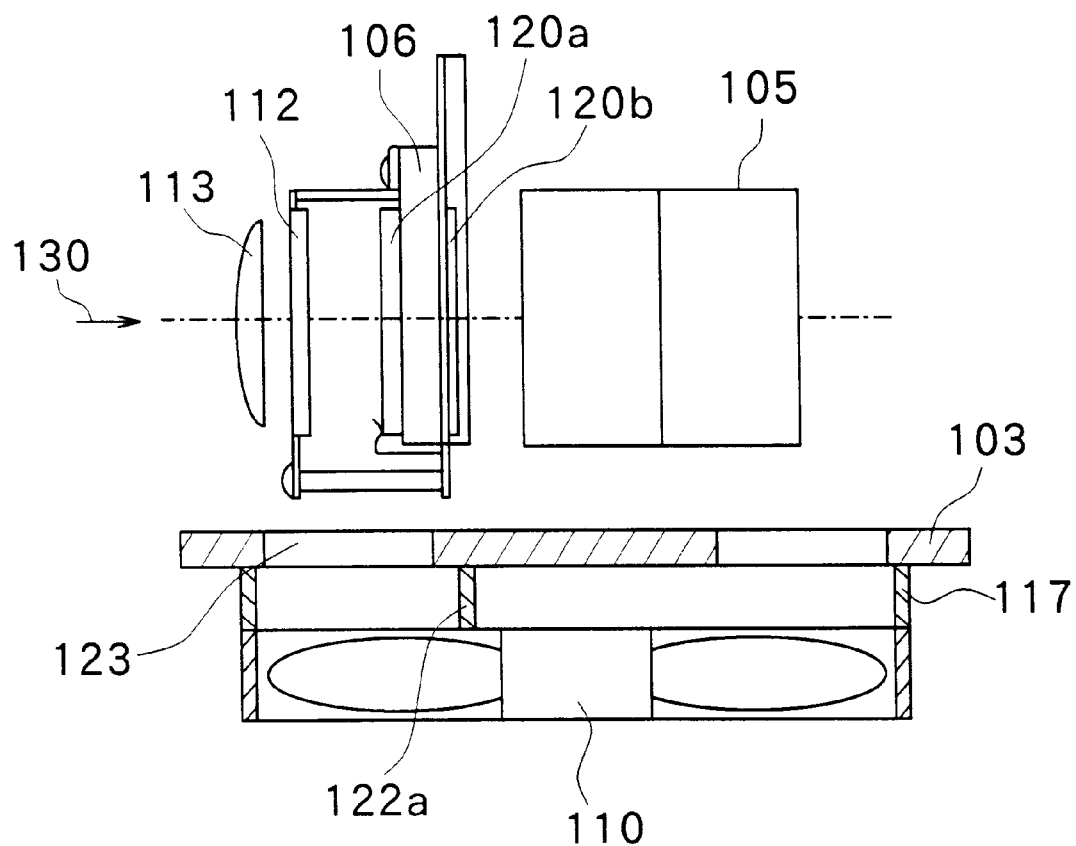
FIG. 3 is a cross section illustrating a configuration of the related-art projector including a liquid crystal light valve, a polarizing plate and a cooling fan.
Figure 4:
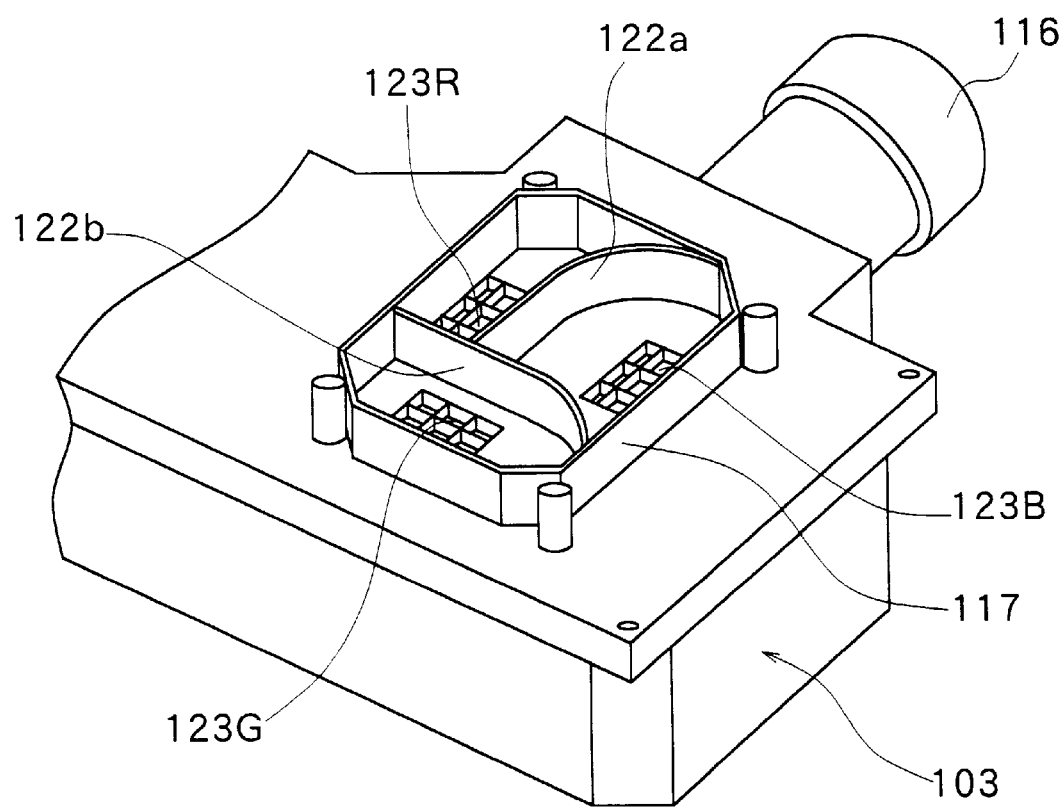
FIG. 4 is a perspective bottom view showing the main part of an optical unit of the related-art projector.
Figure 5:
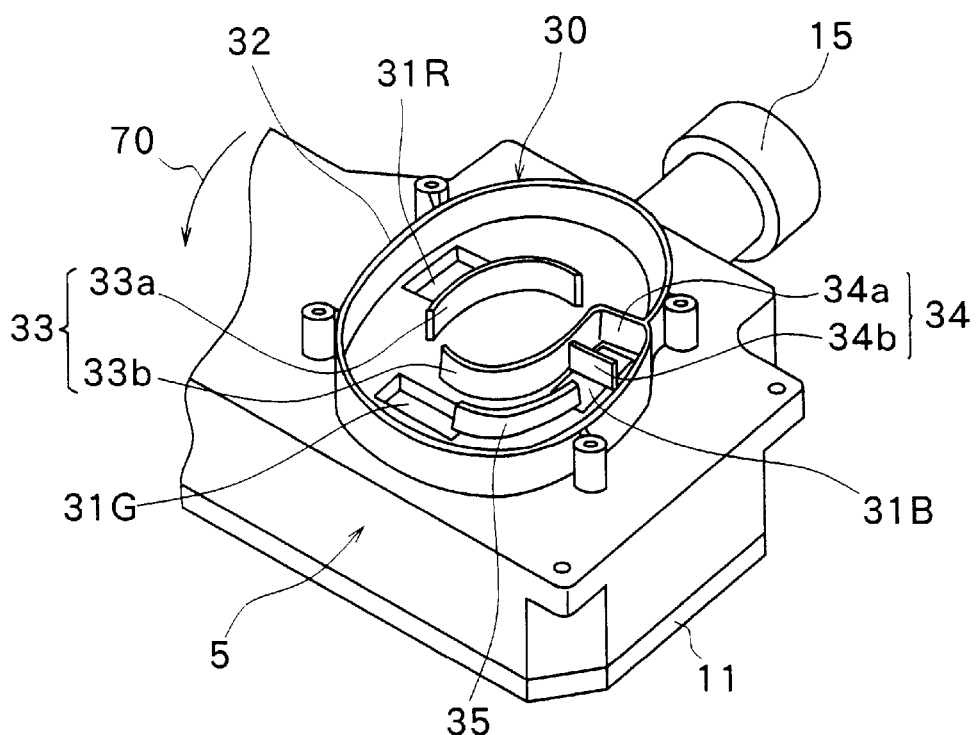
FIG. 5 is a perspective view of an air guide section in a cooling apparatus of a liquid crystal projector of a first embodiment of the invention.
Figure 10:
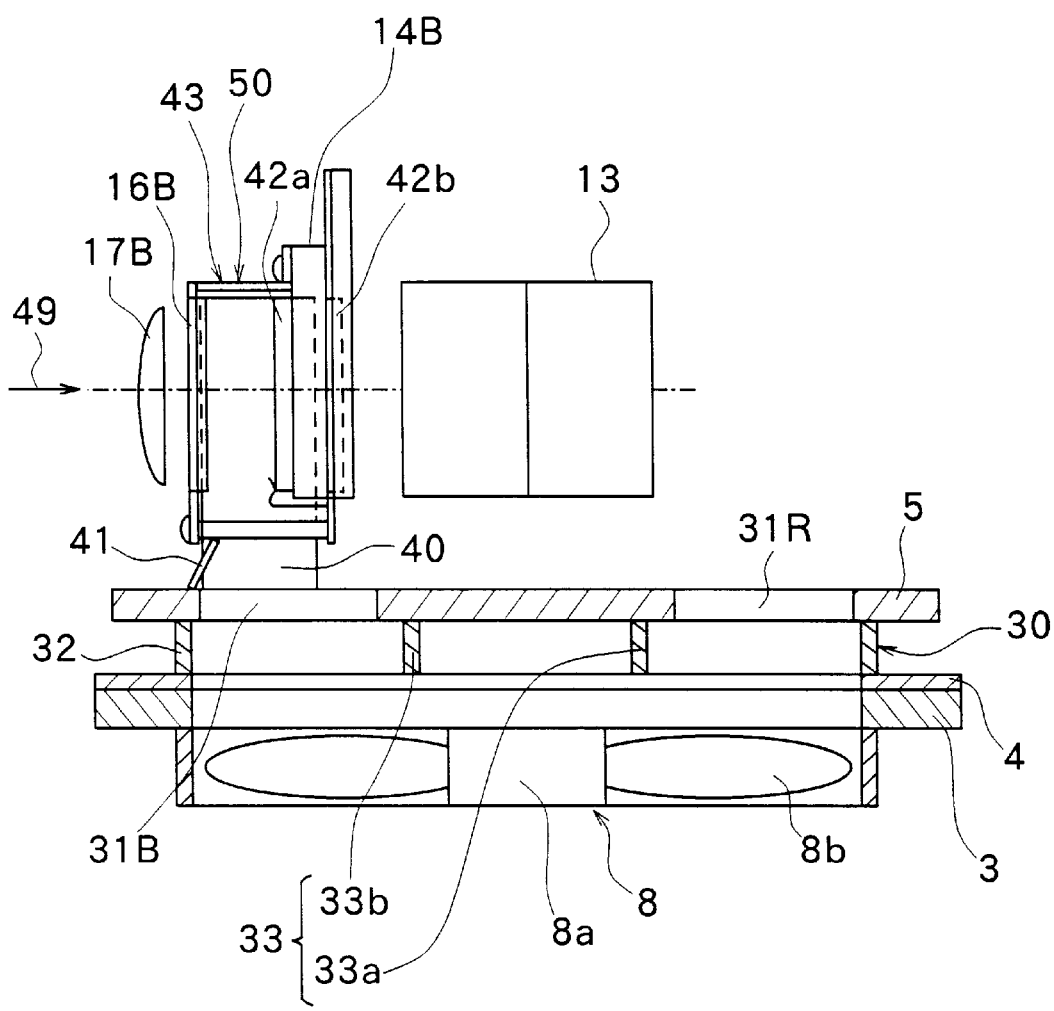
FIG. 10 is a cross section of part of a cooling apparatus of the liquid crystal projector of the first embodiment of the invention, including a light valve and a polarizing plate for blue light.
Figure 11:
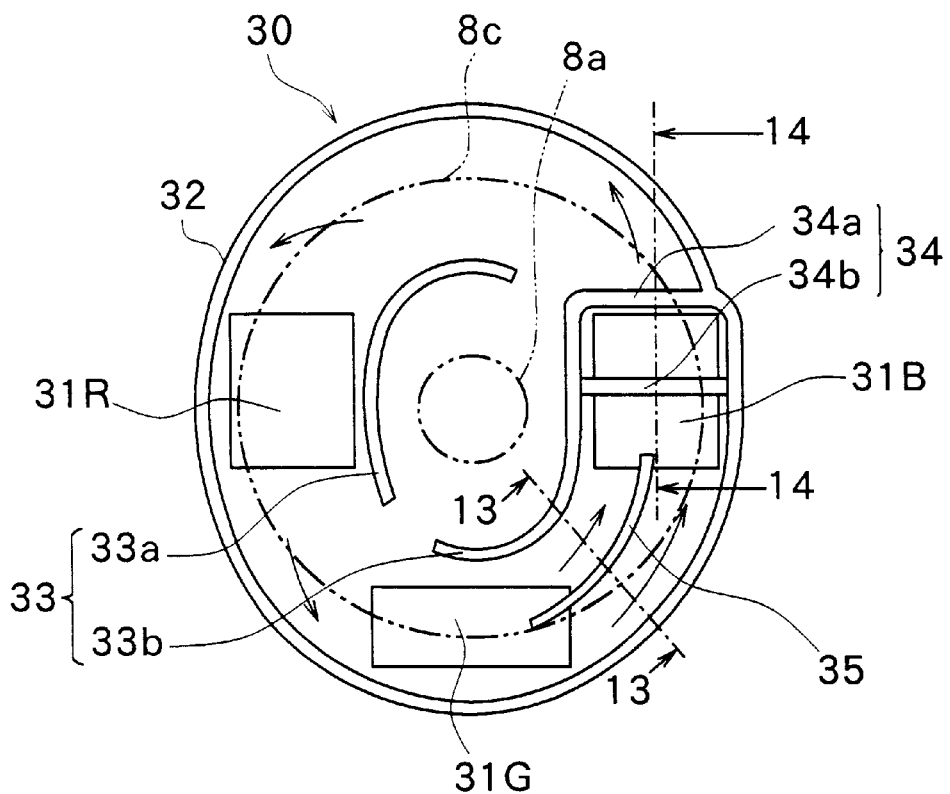
FIG. 11 is a top view of the air guide section of the liquid crystal projector of the first embodiment of the invention.

Referring to FIG. 5, FIG. 10 and FIG. 11, the cooling apparatus of the embodiment will now be described in detail. FIG. 5 is a perspective view of an air guide section in the cooling apparatus. FIG. 10 is a cross section of part of the cooling apparatus including the light valve 14B and the polarizing plate 16B for blue light. FIG. 11 is a top view of the air guide section shown in FIG. 5. Numeral 70 in FIG. 5 indicates the direction in which the cooling fan 8 rotates. Numeral 49 in FIG. 10 indicates light incident on the condenser lens 17B.

As shown, the cooling apparatus comprises the cooling fan 8 previously described and the air guide section 30 formed on the bottom of the optical unit 5 and placed between the cooling fan 8 and the sections to be cooled. The air guide section 30 functions as a means for guiding air currents from the cooling fan 8 to the section to be cooled in accordance with the shape of the cooling fan 8 and the direction of rotation. The cooling fan 8 includes a rotation axis 8a and a plurality of vanes 8b fixed to the rotation axis 8a. In FIG. 11, numeral 8c indicates the locus of the outer edges of the vanes 8b when the cooling fan 8 is rotating. The arrows indicate air flows.

In the bottom of the optical unit 5, three intakes 31R, 31G and 31B are formed for introducing air currents guided by the air guide section 30 to the sections to be cooled in the optical unit 5. The intake 31R is provided in a position corresponding to the light valve 14R and the polarizing plate 16R. The intake 31G is provided in a position corresponding to the light valve 14G and the polarizing plate 16G. The intake 31B is provided in a position corresponding to the light valve 14B and the polarizing plate 16B. The intakes 31R, 31G and 31B are each formed in the shape of rectangle that is long in the direction of arrangement of the light valve and the polarizing plate.

The air guide section 30 includes an external wall 32 and an internal wall 33, each placed between the cooling fan 8 and the sections to be cooled. The external wall 32 is round-shaped and streamline-shaped so as to surround the cooling fan 8 in accordance with the form of the cooling fan 8 and the direction of rotation thereof. The internal wall 33 is round-shaped and streamline-shaped so as to surround the rotation axis 8a of the cooling fan 8 in accordance with the form of the cooling fan 8 and the direction of rotation thereof. Two sections of the internal wall 33 are cut out. The internal wall 33 is thereby divided into walls 33a and 33b.

When seen in terms of air current direction, the wall 33a extends from the position slightly downstream the downstream end of the intake 31B to the position slightly downstream the downstream end of the intake 31R. The wall 33b extends from the position slightly downstream the upstream end of the intake 31G to the position near the downstream end of the intake 31B.

The external wall 32 and the internal wall 33 have a function of adjusting the volume of air passing through the intakes 31R, 31G and 31B. That is, the volume of air passing through the intakes 31R, 31G and 31B may be adjusted by partly widening or narrowing the space between the external wall 32 and the internal wall 33. For example, the volume of air passing through the intake 31B may be increased compared to the volume of air passing through the other intakes 31R and 31G. The space between the external wall 32 and the internal wall 33 is preferably adjusted so as to obtain a desired volume or a velocity of air while actually determining the volume of air passing through the intakes 31R, 31G and 31B or an air velocity proportional to the volume of air.

Between the external wall 32 and the internal wall 33 (the wall 33b), the air guide section 30 further includes an air velocity increasing wall 35 for increasing the velocity of air passing between the external wall 32 and the internal wall 33. The air velocity increasing wall 35 extends from the position slightly upstream the downstream end of the intake 31G to the position near the upstream end of the intake 31B. As the external wall 32 and the internal wall 33, the air velocity increasing wall 35 is streamline-shaped and placed nearly in the center between the external wall 32 and the internal wall 33 (the wall 33b).

In the neighborhood of the intake 31B, the air guide section 30 further includes an air introducing wall 34 for introducing air currents from the cooling fan 8 to the intake 31B. The air introducing wall 34 is placed along the direction intersecting (or orthogonal to, for example,) the external wall 32 and the internal wall 33 (the wall 33b). The air introducing wall 34 is made up of two walls 34a and 34b. The wall 34a is placed along the direction nearly orthogonal to the external wall 32 and the wall 33b between the wall 33b and the external wall 32 near the downstream end of the intake 31B. The wall 34b is placed along the direction nearly orthogonal to the external wall 32 and the wall 33b between the wall 33b and the external wall 32 in the middle in the direction of length of the intake 31B. The height of the wall 34b is lower than that of the wall 34a.

As shown in FIG. 10, shield glasses 42a and 42b are fixed to the sides of the light valve 14B with an adhesive. Shield glasses are similarly fixed to the other light valves 14R and 14G. A reduction in quality of a projected image due to dust and so on deposited on the light valves 14R, 14G and 14B is thereby prevented.

The light valve 14B and the polarizing plate 16B are coupled to each other with a frame 43 at the four corners. Therefore, the space between the light valve 14B and the polarizing plate 16B is mostly opened except at the four corners. Consequently, the air current passing through the intake 31B is likely to be diverged in the space other than the space between the light valve 14B and the polarizing plate 16B. The cooling apparatus of the invention thus comprises a divergence regulator 40 for regulating a divergence of air passing through the intake 31B so that most of the air passes between the light valve 14B and the polarizing plate 16B. The divergence regulator 40 is made up of two plate-shaped ribs projecting from the bottom of the optical unit 5 towards the interior of the optical unit 5. The ribs are placed on sides of the light valve 14B and the polarizing plate 16B in the direction orthogonal to the sheet of FIG. 10. The vertical positions of the upper ends of the ribs correspond to the vertical positions of the upper ends of the light valve 14B and the polarizing plate 16B. In FIG. 10 the rib in front is omitted. Most of the air passing through the intake 31B is regulated by the divergence regulator 40 and passes between the light valve 14B and the polarizing plate 16B.

The cooling apparatus of the embodiment further comprises an air direction adjuster 41 as a means for adjusting the direction of air passing through the intake 31B. The air direction adjuster 41 is placed between the intake 31B and the sections to be cooled (such as the light valve 14B and the polarizing plate 16B). In the embodiment, the air direction adjuster 41 in the shape of plate is placed below the polarizing plate 16B and projects from the bottom of the optical unit 5 towards the interior of the optical unit 5. The upper end of the air direction adjuster 41 is tilted towards the light valve 14B. The direction of the air passing through the intake 31B is adjusted by the air direction adjuster 41 so that the air is directed nearly to the center of the front of the light valve 14B.

The light valve 14B and the polarizing plate 16B for blue light particularly have a high light energy absorption factor and tend to be heated to a high temperature. It is therefore preferable to increase the cooling efficiency of the light valve 14B and the polarizing plate 16B compared to the other light valves 14R and 14G and the polarizing plates 16R and 16G. Therefore, in the embodiment, the divergence regulator 40 and the air direction adjuster 41 are provided only in the air current path towards the sections to be cooled including the light valve 14B and the polarizing plate 16B.

The functions of the components of the cooling apparatus of the embodiment will now be described. The basic function of the external wall 32 and the internal wall 33 is to guide rotating air currents generated by the cooling fan 8 to the sections to be cooled through the intakes 31R, 31G and 31B without reducing the air velocity by regulating and directing the air currents in accordance with the shape of the cooling fan 8 and the direction of rotation thereof. The external wall 32 and the internal wall 33 are therefore streamline-shaped that causes less turbulence in accordance with the shape of the cooling fan 8 and the direction of rotation thereof.

Figure 12:
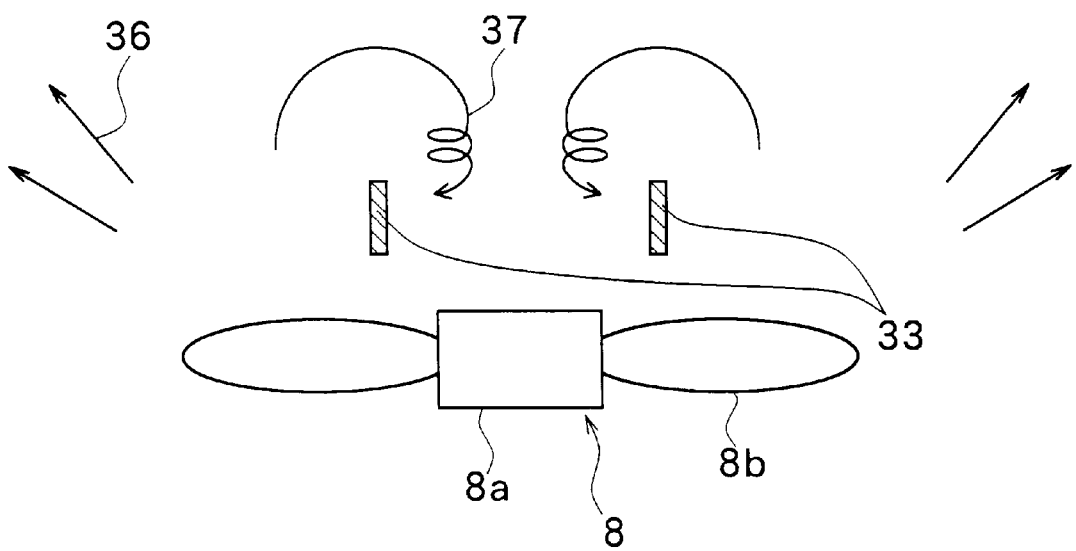
FIG. 12 illustrates air flows in the neighborhood of a cooling fan of the liquid crystal projector of the first embodiment of the invention.

Another function of the internal wall 33 is to separate the neighborhood of the rotation axis 8a of the cooling fan 8 from the part around the neighborhood of the rotation axis 8a. As a result, the air flow returning to the cooling fan 8 that is generated in the neighborhood of the rotation axis 8a will not affect the air current directed towards the front of the cooling fan 8. FIG. 12 illustrates air flows in the neighborhood of the cooling fan 8 observed by experiment. In FIG. 12, numeral 36 indicates air currents directed towards the front of the cooling fan 8. Numeral 37 indicates air flows returning to the cooling fan 8 that are generated in the neighborhood of the rotation axis 8a. The air flows 37 returning to the cooling fan 8 are turbulent flows that may affect the air currents 36 directed towards the front of the cooling fan 8 by making the movement of the air currents 36 unstable, for example. The internal wall 33 therefore separates the neighborhood of the rotation axis 8a of the cooling fan 8 from the part around the neighborhood of the rotation axis 8a so that the air flows 37 returning to the cooling fan 8 will not affect the air currents 36 directed towards the front of the cooling fan 8.

If the internal wall 33 is continuously formed all around, negative pressure applied in the neighborhood of the rotation axis 8a becomes so high that the air currents 36 directed towards the front of the cooling fan 8 may be affected. Therefore, in the embodiment, the two sections of the internal wall 33 are cut out. The negative pressure applied in the neighborhood of the rotation axis 8a is thereby decreased so as to reduce effect on the air currents 36 directed towards the front of the cooling fan 8.

Figure 13:
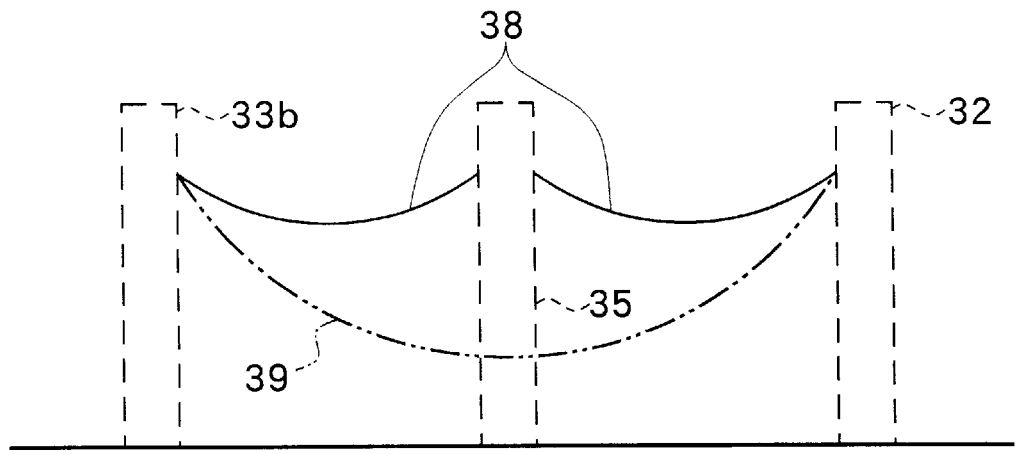
FIG. 13 is a schematic view illustrating an air velocity distribution in the cross section taken along line 13—13 of FIG. 11.

Referring to FIG. 13, the function of the air velocity increasing wall 35 will now be described. FIG. 13 is a schematic view illustrating the air velocity distribution in the cross section taken along line 13—13 of FIG. 11. Numeral 38 indicates the air velocity distribution of the embodiment of the invention. Numeral 39 indicates the air velocity distribution where the air velocity increasing wall 35 is not provided. Both distributions are based on experimental results of determining air velocity. The result obtained without the air velocity increasing wall 35 indicates that the velocity of air flowing along the wall is higher than the velocity of air flowing away from the wall. Without the air velocity increasing wall 35, as indicated with numeral 39, the air velocity is high in the neighborhood of the external wall 32 and the wall 33b (the internal wall 33) while the velocity is low in the center. It is thus difficult to sufficiently increase the velocity of air directed to the intake 31B. In the embodiment, the air velocity increasing wall 35 is provided through the use of the fact that the velocity of air flowing along the wall is high. As indicated with numeral 38, the air velocity is thus increased on both sides of the air velocity increasing wall 35. The velocity of air passing between the external wall 32 and the wall 33b is thereby increased as a whole, compared to the case where the air velocity increasing wall 35 is not provided. As thus described, the air velocity increasing wall 35 has the function of increasing the velocity of air directed to the intake 31B as a whole by increasing the velocity of air passing between the external wall 32 and the wall 33b. As a result, a sufficient volume of air is supplied to the light valve 14B and the polarizing plate 16B.

Figure 14:
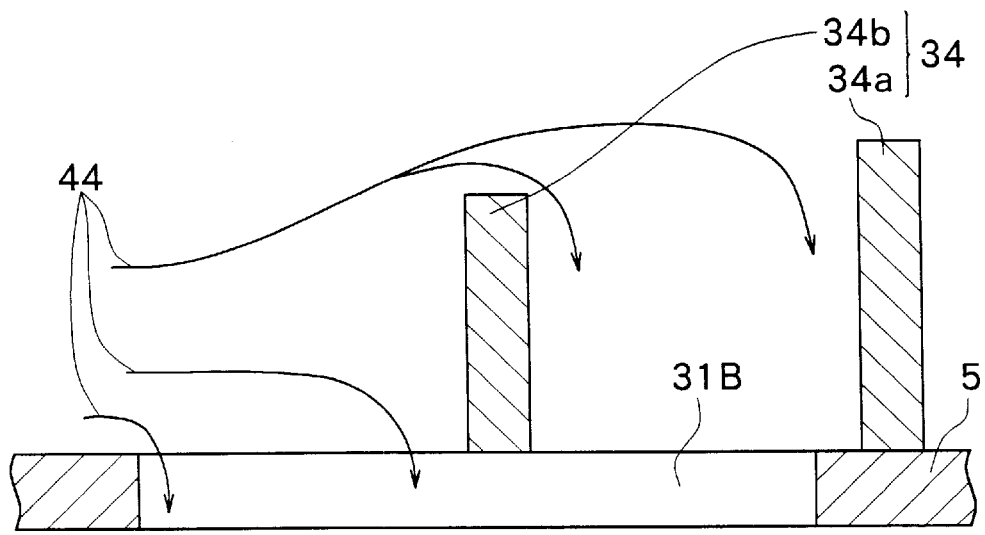
FIG. 14 illustrates air flows generated by the cooling fan in the cross section taken along line 14—14 of FIG. 11.
Figure 15:
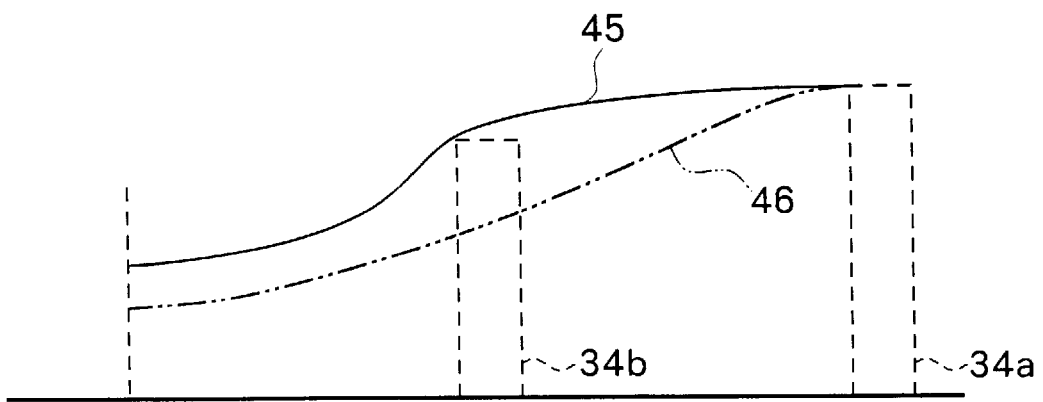
FIG. 15 is a schematic view illustrating an air velocity distribution in the cross section taken along line 14—14 of FIG. 11.

Referring to FIG. 14 and FIG. 15, the function of the air introducing wall 34 will now be described. FIG. 14 illustrates air flows in the cross section taken along line 14—14 of FIG. 11. Numeral 44 indicates air flows. FIG. 15 is a schematic view illustrating the air velocity distribution in the cross section taken along line 14—14 of FIG. 11. In FIG. 15, numeral 45 indicates the air velocity distribution of the embodiment of the invention. Numeral 46 indicates the air velocity distribution where the wall 34b is not provided. FIG. 14 and FIG. 15 are both based on experimental results of determining air velocity.

The wall 34a of the air introducing wall 34 has a function of introducing an air current to the intake 31B without letting the air current escape downstream, and increasing the volume of air directed towards the intake 31B. The wall 34b has a function of increasing the velocity of air directed to the intake 31B as a whole by increasing the velocity of air on both sides of the wall 34b as indicated with numeral 45 in FIG. 15, compared to the example without the wall 34b as indicated with numeral 46, through the use of the fact that the velocity of air flowing along the wall is high, as the air velocity increasing wall 35.

As previously described, it is preferable to increase the cooling efficiency of the light valve 14B and the polarizing plate 16B for blue light compared to the other light valves 14R and 14G and the polarizing plates 16R and 16G. Therefore, in the embodiment, the air introducing wall 34 and the air velocity increasing wall 35 are provided only in the air current path towards the sections to be cooled including the light valve 14B and the polarizing plate 16B. The functions of the divergence regulator 40 and the air direction adjuster 41 are previously described.

The outline of the operation of the liquid crystal projector 1 of the embodiment will now be described. In the projector 1, ultraviolet rays and infrared rays of white light emitted from the light source 10 and incident on the optical unit 5 are removed by the TV-IR cut filter 18. The light is then transformed into P polarized light at the polarization transforming device 19. Next, the illuminance distribution is unified by the fly's-eye lens 20. The light then enters the dichroic mirror 21.

Red light of the light entering the dichroic mirror 21 reflects off the dichroic mirror 21 and further reflects off the reflection mirror 25. The red light then passes through the condenser lens 17R and the polarizing plate 16R and is radiated onto the light valve 14R. The light entering the dichroic mirror 21 other than the red light is transmitted through the dichroic mirror 21 and enters the dichroic mirror 22. Green light of the light entering the dichroic mirror 22 reflects off the dichroic mirror 22 and passes through the condenser lens 17G and the polarizing plate 16G. The green light is then applied to the light valve 14G. Blue light of the light entering the dichroic mirror 22 is transmitted through the dichroic mirror 22, goes through the relay lens 23, the reflection mirror 24, the relay lens 27, the reflection mirror 26, the condenser lens 17B and the polarizing plate 16B. The blue light is then applied to the light valve 14B.

The rays of color light incident on the light valves 14R, 14G and 14B are each spatially modulated by the respective light valves 14R, 14G and 14B based on image signals for color images. The rays of color light are composited by the prism 13 and enlarged and projected onto the screen 7 by the projection lens 15 through the reflection mirror 6. A color image is thus displayed on the screen 7.

The operation of the cooling apparatus in the projector 1 will now be described. The cooling fan 8 draws in outside air through the duct unit 9 and generates air currents. The air currents are sent to the air guide section 30 of the optical unit 5 through the mold chassis 3 and the opening in the board 4. In the neighborhood of the vanes 8b of the cooling fan 8, the air currents generated by the cooling fan 8 rotate in the direction similar to the direction in which the cooling fan 8 rotates. The external wall 32 and the internal wall 33 guide the rotating air currents generated by the cooling fan 8 to the sections to be cooled through the intakes 31R, 31G and 31B without reducing the air velocity by regulating and directing the air currents in accordance with the shape of the cooling fan 8 and the direction of rotation thereof. The volume of air passing through the intakes 31R, 31G and 31B is adjusted by the space between the external wall 32 and the internal wall 33. For example, the volume of air passing through the intake 31B is adjusted to be more than the volumes of air passing through the other intakes 31R and 31G.

The internal wall 33 separates the neighborhood of the rotation axis 8a of the cooling fan 8 from the part around the neighborhood of the rotation axis 8a. As a result, the air flow returning to the cooling fan 8 that is generated in the neighborhood of the rotation axis 8a will not affect the air currents directed towards the front of the cooling fan 8. The internal wall 33 two sections of which are cut out decreases the negative pressure applied to the neighborhood of the rotation axis 8a so as to reduce the effect on the air currents 36 directed towards the front of the cooling fan 8.

The air currents passing through the air guide section 30 are taken in through the intakes 31R, 31G and 31B and each sent to the sections to be cooled including the light valve 14R and the polarizing plate 16R, the light valve 14G and the polarizing plate 16G, and the light valve 14B and the polarizing plate 16B. The sections are thus cooled by the air currents. The air heated in the optical unit 5 is exhausted through the part of the top of the optical unit 5 uncovered with the lid 11.

The velocity of the air current directed towards the intake 31B is increased. This is because the velocity of the air current passing through the air velocity increasing wall 35 is increased. Since the air velocity is proportional to the volume of air, the volume of air increases as the air velocity increases. The volume and velocity of the air current directed towards the intake 31B is further increased by the air introducing wall 34. Most of the air currents passing through the intake 31B are regulated by the divergence regulator 40 and passes between the light valve 14B and the polarizing plate 16B. The direction of the air currents passing through the intake 31B is adjusted by the air direction adjuster 41 so that the air currents are directed nearly to the center of the front of the light valve 14B. In this way, the volume of air directed to the light valve 14B and the polarizing plate 16B is increased by the air velocity increasing wall 35, the air introducing wall 34 and the divergence regulator 40. The cooling efficiency of the light valve 14B and the polarizing plate 16B subject to high temperature is thereby improved. Compared to the polarizing plate 16B, the light valve 14B is required to be more cooled. In the embodiment, the cooling efficiency of the light valve 14B is further improved since the direction of air currents is adjusted by the air direction adjuster 41 so that the air currents are directed nearly to the center of the front of the light valve 14B.

According to the liquid crystal projector 1 and the cooling apparatus of the embodiment described so far, the air guide section 30 guides the rotating air currents generated by the cooling fan 8 to the sections to be cooled through the intakes 31R, 31G and 31B without reducing the air velocity by regulating and directing the air currents in accordance with the shape of the cooling fan 8 and the direction of rotation thereof. The sections to be cooled are thus efficiently cooled. As a result, a reduction in properties of the optical components such as the light valves 14R, 14G and 14B and the polarizing plates 16R, 16G and 16B is prevented. The lives of the optical components are increased as well. Furthermore, the size of the cooling fan 8 may be reduced since the cooling efficiency is improved. The sizes of the optical unit 5 and the projector 1 may be reduced, too. Since the cooling efficiency is improved, the velocity of the cooling fan 8 may be reduced and the noise of the projector 1 may be thereby reduced.

According to the embodiment, the volume of air passing through the intakes 31R, 31G and 31B is adjusted by the space between the external wall 32 and the internal wall 33. For example, the volume of air passing through the intake 31B is adjusted to be more than the volumes of air passing through the other intakes 31R and 31G.

The internal wall 33 separates the neighborhood of the rotation axis 8a of the cooling fan 8 from the part around the neighborhood of the rotation axis 8a. As a result, the air flow returning to the cooling fan 8 that is generated in the neighborhood of the rotation axis 8a will not affect the air currents directed towards the front of the cooling fan 8. The internal wall 33 part of which is cut out decreases the negative pressure applied to the neighborhood of the rotation axis 8a so as to reduce the effect on the air currents 36 directed towards the front of the cooling fan 8.

According to the embodiment, the cooling efficiency of the light valve 14B and the polarizing plate 16B subject to high temperature is particularly improved by the air velocity increasing wall 35, the air introducing wall 34 and the divergence regulator 40. The cooling efficiency of the light valve 14B is further improved by the air direction adjuster 41.

Figure 16:
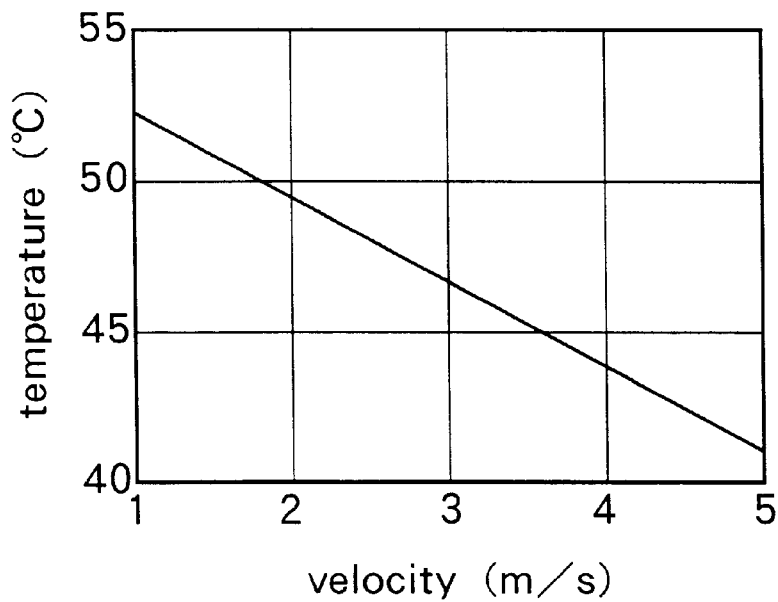
FIG. 16 is a plot for indicating an experimental result of determining an improvement in a cooling efficiency with an increase in air velocity.

FIG. 16 is a plot for indicating an experimental result of determining an improvement in the cooling efficiency with an increase in the air velocity. In FIG. 16, the horizontal axis indicates the air velocity measured at a point 50 in FIG. 10 (the midpoint between the upper end of the light valve 14B and the upper end of the polarizing plate 16B). The vertical axis indicates a temperature of the surface of the light valve 14B to be cooled. The experiment is carried out by determining the surface temperature of the light valve 14B while changing the air velocity. The result indicates that the surface temperature of the light valve 14B linearly decreases with increases in the air velocity. Accordingly, the sections to be cooled are cooled by increasing the velocity of air directed to the sections in the embodiment. The cooling efficiency is thereby improved.

Figure 17:
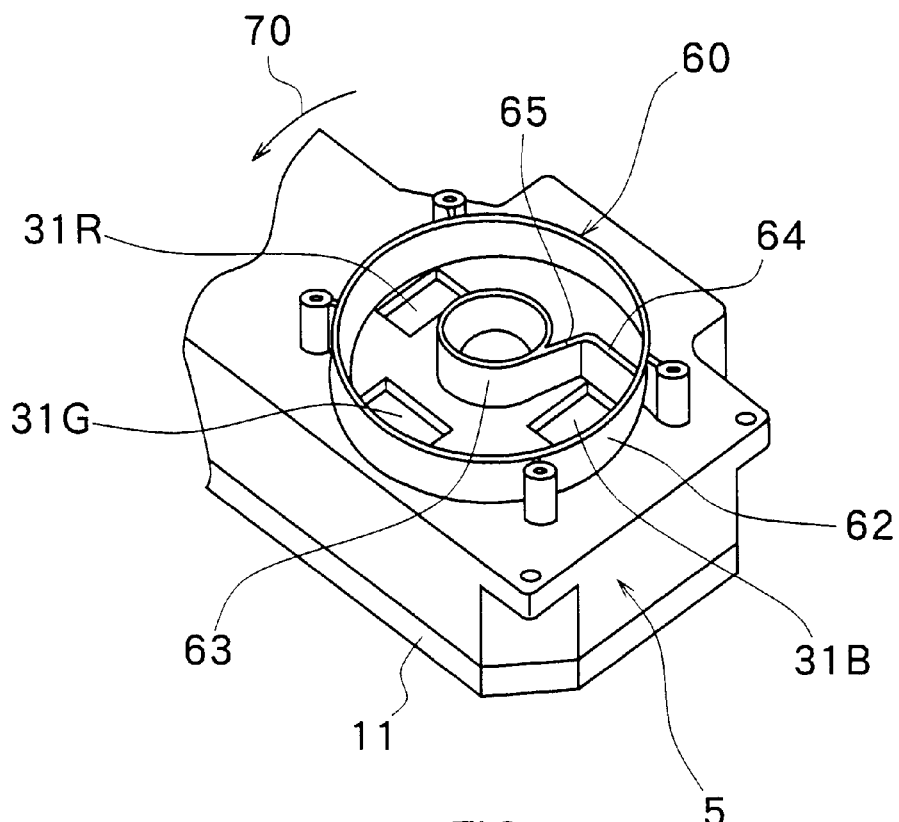
FIG. 17 is a perspective view showing an air guide section of a cooling apparatus of a liquid crystal projector of a second embodiment of the invention.

FIG. 17 is a perspective view showing an air guide section of a cooling apparatus of a liquid crystal projector of a second embodiment of the invention. The air guide section 60 of the second embodiment includes an external wall 62 and an internal wall 63, each placed between the cooling fan 8 and the sections to be cooled. The external wall 62 is round-shaped and streamline-shaped so as to surround the cooling fan 8 in accordance with the form of the cooling fan 8 and the direction of rotation thereof. The internal wall 63 is round-shaped and streamline-shaped so as to surround the rotation axis 8a of the cooling fan 8 in accordance with the form of the cooling fan 8 and the direction of rotation thereof. Between the internal wall 63 and the external wall 62 in the neighborhood of downstream end of the intake 31B, the air guide section 60 further includes an air introducing wall 64 for introducing air currents from the cooling fan 8 to the intake 31B. The air introducing wall 64 is placed along the direction intersecting the external wall 32 and the internal wall 33. The air guide section 60 further includes a coupling wall 65 for coupling the internal wall 63 and the air introducing wall 64 to each other. The basic function of the air guide section 60 of the second embodiment is similar to that of the air guide section 30 of the first embodiment.

In the second embodiment, no part of the internal wall 63 is cut out.

The air introducing wall 64 is not made up of two walls as in the first embodiment but only of a wall corresponding to the wall 34a in the first embodiment. The wall has a function of introducing air currents without letting them escape downstream, and increasing the volume of air directed to the intake 31B. In the second embodiment, the air velocity increasing wall 35 is not provided. The remainder of the configuration of the second embodiment is similar to that of the first embodiment.

According to the second embodiment, the structure of the air guide section 60 is simpler, compared to the first embodiment. The second embodiment achieves the functions and effects similar to those of the first embodiment except those obtained through cutting out the internal wall and those obtained with the air velocity increasing wall 35 and the wall 34b.

The invention is not limited to the foregoing embodiments but may be practiced in still other ways. For example, although the air introducing wall 34, the air velocity increasing wall 35, the divergence regulator 40 and the air direction adjuster 41 are provided only in the air current path towards the sections to be cooled including the light valve 14B and the polarizing plate 16B in the first embodiment, those components may be provided in the air current path towards the sections to be cooled including the light valves and the polarizing plates for the other colors.

The invention is not limited to the triple-plate liquid crystal projector as described in the embodiments but may be applied to any other projector such as a single-plate projector having a single liquid crystal light valve. Furthermore, the invention may be applied to any optical apparatus including a light source for emitting light and an optical system through which light emitted from the light source passes, sections of the apparatus including at least part of the optical system requiring to be cooled.

Obviously many modifications and variations of the present invention are possible in the light of the above teachings. It is therefore to be understood that within the scope of the appended claims the invention may be practiced otherwise than as specifically described.

What is claimed is:

1. A picture display apparatus comprising:
   a light source for emitting light;
   an image generating section for generating an image by spatially modulating the light emitted from the light source in response to information about a picture for display;
   an optical system for projecting the light modulated at the image generating section;
   a cooling fan for generating air currents for cooling a predetermined section to be cooled including at least part of the image generating section; and
   means for guiding the air currents from the cooling fan to the predetermined section to be cooled in accordance with a shape of the cooling fan and a direction of rotation thereof, wherein
   the means for guiding includes an internal wall structure and an external wall structure, the internal wall structure being placed between the cooling fan and the predetermined section to be cooled and being formed of curved sections surrounding an extension of an axis of rotation of the cooling fan.

2. The picture display apparatus according to claim 1 wherein the external wall structure is placed between the cooling fan and the predetermined section to be cooled and is formed of curved sections surrounding an extension of an axis of rotation of the cooling fan.

3. The picture display apparatus according to claim 1 further comprising:
   one or more intakes formed between the cooling fan and the predetermined section to be cooled for introducing the air currents guided by the means for guiding to the predetermined section to be cooled; and
   a divergence regulator for regulating divergence of air currents passing through at least one of the intakes.

4. The picture display apparatus according to claim 2 wherein the internal wall has a portion thereof cut out.

5. The picture display apparatus according to claim 2 wherein the means for guiding further includes an air velocity increasing wall arranged between the external wall and the internal wall for increasing a velocity of the air currents generated by the cooling fan passing between the external wall and the internal wall.

6. The picture display apparatus according to claim 1 further comprising a plurality of intakes formed between the cooling fan and the predetermined section to be cooled for introducing the air currents guided by the means for guiding to the predetermined section to be cooled, wherein the means for guiding includes means for adjusting a volume of air currents passing through the intakes.

7. The picture display apparatus according to claim 2 further comprising one or more intakes formed between the cooling fan and the predetermined section to be cooled for introducing the air currents guided by the means for guiding to the predetermined section to be cooled, wherein the means for guiding includes a wall arranged lying along a direction intersecting the external wall and the internal wall at one of the intakes for introducing the air currents from the cooling fan to one or more intakes.

8. The picture display apparatus according to claim 2 further comprising one or more intakes formed between the cooling fan and the predetermined section to be cooled for introducing the air currents guided by the means for guiding includes a plurality of walls arranged lying along a direction intersecting the external wall and the internal wall and arranged next to one of the intakes for introducing the air currents from the cooling fan to at least one of the intakes.

9. The picture display apparatus according to claim 1 further comprising:
   one or more intakes formed between the cooling fan and the predetermined section to be cooled for introducing the air currents guided by the means for guiding to the predetermined section to be cooled; and
   means arranged between at least one of the intakes and the predetermined section to be cooled for adjusting a direction of air currents passing through the intake.

10. The picture display apparatus according to claim 1 wherein the predetermined section to be cooled includes in the image generating section:
    a polarizing plate for making the light from the light source into linearly polarized light and
    a liquid crystal light valve for spatially modulating light passing through the polarizing plate in accordance with the information about the picture for display.

11. A cooling apparatus in an optical apparatus including a light source for emitting light and an optical system through which the light emitted from the light source passes for cooling a predetermined section to be cooled including at least part of the optical system, the cooling apparatus comprising:
    a cooling fan for generating air currents for cooling the predetermined section to be cooled; and
    means for guiding the air currents from the cooling fan to the predetermined section to be cooled and having a shape based on a shape of the cooling fan and a direction of rotation thereof, wherein
    the means for guiding includes an internal wall structure and an external wall structure, the internal wall structure being placed between the cooling fan and the predetermined section to be cooled and being formed of curved sections surrounding an extension of an axis of rotation of the cooling fan.

12. The cooling apparatus according to claim 11 wherein the external wall structure is arranged between the cooling fan and the predetermined section to be cooled and is formed of curved sections surrounding an extension of an axis of rotation of the cooling fan.

13. The cooling apparatus according to claim 11 further comprising:
    one or more intakes formed between the cooling fan and the predetermined section to be cooled for introducing the air currents guided by the means for guiding to the predetermined section to be cooled; and a divergence regulator for regulating divergence of air currents passing through at least one of the intakes.

14. The cooling apparatus according to claim 12 wherein the internal wall has a portion thereof cut out.

15. The cooling apparatus according to claim 12 wherein the means for guiding further includes an air velocity increasing wall arranged between the external wall and the internal wall for increasing a velocity of the air currents generated by the cooling fan passing between the external wall and the internal wall.

16. The cooling apparatus according to claim 11 further comprising a plurality of intakes formed between the cooling fan and the predetermined section to be cooled for introducing the air currents guided by the means for guiding to the predetermined section to be cooled, wherein the means for guiding includes means for adjusting a volume of air currents passing through the intakes.

17. The cooling apparatus according to claim 12 further comprising one or more intakes formed between the cooling fan and the predetermined section to be cooled for introducing the air currents guided by the means for guiding to the predetermined section to be cooled, wherein the means for guiding includes a wall arranged lying along a direction intersecting the external wall and the internal wall of at least one of the intakes for introducing the air currents from the cooling fan to one or more intakes.

18. The cooling apparatus according to claim 12 further comprising at least one intake formed between the cooling fan and the predetermined section to be cooled for introducing the air currents guided by the means for guiding to the predetermined section to be cooled, wherein the means for guiding includes a plurality of walls arranged lying along a direction intersecting the external wall and the internal wall and arranged next to one of the intakes for introducing the air currents from the cooling fan to at least one of the intakes.

19. The cooling apparatus according to claim 11 further comprising:

one or more intakes formed between the cooling fan and the predetermined section to be cooled for introducing the air currents guided by the means for guiding to the predetermined section to be cooled; and means arranged between at least one of the intakes and the predetermined section to be cooled for adjusting a direction of air currents passing through the intake.

* * * * *